(12) United States Patent
Fanello et al.

(10) Patent No.: US 12,066,282 B2
(45) Date of Patent: Aug. 20, 2024

(54) VOLUMETRIC PERFORMANCE CAPTURE WITH RELIGHTING

(71) Applicant: GOOGLE LLC, Mountain View, CA (US)

(72) Inventors: Sean Ryan Francesco Fanello, San Francisco, CA (US); Kaiwen Guo, Beijing (CN); Peter Christopher Lincoln, San Francisco, CA (US); Philip Lindsley Davidson, Arlington, MA (US); Jessica L. Busch, Long Beach, CA (US); Xueming Yu, Arcadia, CA (US); Geoffrey Harvey, Culver City, CA (US); Sergio Orts Escolano, San Francisco, CA (US); Rohit Kumar Pandey, Mountain View, CA (US); Jason Dourgarian, Los Angeles, CA (US); Danhang Tang, San Francisco, CA (US); Adarsh Prakash Murthy Kowdle, San Francisco, CA (US); Emily B. Cooper, San Francisco, CA (US); Mingsong Dou, Cupertino, CA (US); Graham Fyffe, Los Angeles, CA (US); Christoph Rhemann, Marina Del Rey, CA (US); Jonathan James Taylor, San Francisco, CA (US); Shahram Izadi, Tiburon, CA (US); Paul Ernest Debevec, Culver City, CA (US)

(73) Assignee: GOOGLE LLC, Mountain View, CA (US)

( * ) Notice: Subject to any disclaimer, the term of this patent is extended or adjusted under 35 U.S.C. 154(b) by 484 days.

(21) Appl. No.: 17/413,847

(22) PCT Filed: Nov. 11, 2020

(86) PCT No.: PCT/US2020/059973
§ 371 (c)(1),
(2) Date: Jun. 14, 2021

(87) PCT Pub. No.: WO2021/096930
PCT Pub. Date: May 20, 2021

(65) Prior Publication Data
US 2022/0065620 A1  Mar. 3, 2022

Related U.S. Application Data

(60) Provisional application No. 62/934,320, filed on Nov. 12, 2019.

(51) Int. Cl.
*G01B 11/25* (2006.01)
*G01B 11/245* (2006.01)
(Continued)

(52) U.S. Cl.
CPC ........ *G01B 11/2513* (2013.01); *G01B 11/245* (2013.01); *G06T 15/506* (2013.01); *G06T 17/205* (2013.01)

(58) Field of Classification Search
None
See application file for complete search history.

(56) References Cited

U.S. PATENT DOCUMENTS 10,574,938 B1 *  2/2020  Trail ................... G06F 3/013
2015/0294492 A1 * 10/2015  Koch .................. H04N 13/111
                                                            345/426

(Continued)

OTHER PUBLICATIONS

B. De Decker, J. Kautz, T. Mertens and P. Bekaert, "Capturing multiple illumination conditions using time and color multiplexing," 2009 IEEE Conference on Computer Vision and Pattern Recognition, Miami, FL, USA, 2009, pp. 2536-2543, doi: 10.1109/CVPR .2009.5206752. (Year: 2009).*

(Continued)

*Primary Examiner* — Stuart D Bennett

(57) ABSTRACT

A lighting stage includes a plurality of lights that project alternating spherical color gradient illumination patterns (Continued)

onto an object or human performer at a predetermined frequency. The lighting stage also includes a plurality of cameras that capture images of an object or human performer corresponding to the alternating spherical color gradient illumination patterns. The lighting stage also includes a plurality of depth sensors that capture depth maps of the object or human performer at the predetermined frequency. The lighting stage also includes (or is associated with) one or more processors that implement a machine learning algorithm to produce a three-dimensional (3D) model of the object or human performer. The 3D model includes relighting parameters used to relight the 3D model under different lighting conditions.

29 Claims, 8 Drawing Sheets

(51) Int. Cl.
    G06T 15/50        (2011.01)
    G06T 17/20        (2006.01)

(56) References Cited

U.S. PATENT DOCUMENTS

| | | | |
|---|---|---|---|
| 2018/0053339 A1* | 2/2018 | Chui | G06T 5/50 |
| 2019/0088004 A1* | 3/2019 | Lucas | G06T 19/20 |
| 2019/0272670 A1* | 9/2019 | Tagliasacchi | G06T 7/251 |
| 2019/0340810 A1* | 11/2019 | Sunkavalli | G06T 15/506 |
| 2020/0242834 A1* | 7/2020 | Chachek | G06T 15/08 |

OTHER PUBLICATIONS

Li Zhang, Noah Snavely, Brian Curless, and Steven M. Seitz. 2004. Spacetime faces: high resolution capture for modeling and animation. In ACM SIGGRAPH 2004 Papers (SIGGRAPH '04). Association for Computing Machinery, New York, NY, USA, 548-558. https://doi.org/10.1145/1186562.1015759 (Year: 2004).*

Anderson, Robert et al., "Jump: Virtual Reality Video," ACM Transactions on Graphics, vol. 35, No. 6; Nov. 2016; pp. 1-13.

Balakrishnan, Guha et al., "Synthesizing Images of Humans in Unseen Poses," Proceedings of the 2018 IEEE Conference on Computer Vision and Pattern Recognition, Jun. 18-23, 2018; pp. 8340-8348.

Barnes, Connelly et al., "PatchMatch: A Randomized Correspondence Algorithm for Structural Image Editing," ACM Transactions on Graphics (Proc. SIGGRAPH), vol. 28, Issue 3; Aug. 2009; pp. 1-11.

Barron, Jonathan T. et al., "Shape, Illumination, and Reflectance from Shading," IEEE Transactions on Pattern Analysis and Machine Intelligence, vol. 37, No. 8; Aug. 2015; pp. 1670-1687.

Beeler, Thabo et al., "High-Quality Single-Shot Capture of Facial Geometry," In ACM SIGGRAPH 2010; Article No. 40, Jul. 2012; pp. 1-9.

Beeler, Thabo et al., "High-Quality Passive Facial Performance Capture Using Anchor Frames," In ACM SIGGRAPH 2011; Jul. 2011; pp. 1-10.

Blanz, Volker et al., "A Morphable Model for the Synthesis of 3D Faces," Proceedings of the 26th Annual Conference on Computer Graphics and Interactive Techniques; Jul. 1999; pp. 187-194.

Bleyer, Michael et al., "PatchMatch Stereo—Stereo Matching with Slanted Support Windows," Bmvc; Aug. 2011, vol. 11; pp. 1-11.

Chan, Caroline et al., "Everybody Dance Now," Proceedings of the IEEE/CVF International Conference on Computer Vision; Oct.-Nov. 2019; 5933-5942.

Chen, Liang-Chieh et al., "DeepLab: Semantic Image Segmentation with Deep Convolutional Nets, Atrous Convolution, and Fully Connected CRFs," IEEE Transactions on Pattern Analysis and Machine Intelligence, Apr. 2017; 40(4); pp. 834-848.

Collet, Alvaro et al., "High-Quality Streamable Free-Viewpoint Video," ACM Transactions on Graphics, Jul. 27, 2015; 34(4); pp. 1-13.

Debevec, Paul et al., "Acquiring the Reflectance Field of a Human Face," Proceedings of the 27th Annual Conference on Computer Graphics and Interactive Techniques; Jul. 1, 2000; pp. 145-156.

Deng, Jia et al., "ImageNet: A Large-Scale Hierarchical Image Database," 2009 IEEE Conference on Computer Vision and Pattern Recognition; Jun. 20, 2009; pp. 248-255.

Dou, Mingsong et la., "Motion2Fusion: Real-time Volumetric Performance Capture," ACM Transactions on Graphics; vol. 36, Issue 6; Nov. 2017; Article No. 246; pp. 1-16.

Dou, Mingsong et al., "Fusion4D: Real-time Performance Capture of Challenging Scenes," ACM Transactions on Graphics (TOG); Jul. 11, 2016; 35(4); pp. 1-3.

Dou, Mingsong et al., "3D Scanning Deformable Objects with a Single RGBD Sensor," Proceedings of the IEEE Conference on Computer Vision and Pattern Recognition; Jun. 2015; pp. 493-501.

Du, Ruofei et al., "Montage4D: Real-time Seamless Fusion and Stylization of Multiview Video Textures," Journal of Computer Graphics Techniques, vol. 8, No. 1; Jan. 17, 2019; 34 pages.

Fanello, Sean Ryan et al., "Low Compute and Fully Parallel Computer Vision with HashMatch," 2017 IEEE International Conference on Computer Vision; Oct. 22, 201; pp. 3894-3903.

Fanello, Sean Ryan et al., "UltraStereo: Efficient Learning-based Matching for Active Stereo Systems," 2017 IEEE Conference on Computer Vision and Pattern Recognition; Jul. 21, 2017; pp. 6535-6544.

Fyffe, Graham et al., "Cosine Lobe Based Relighting from Gradient Illumination Photographs," SIGGRAPH'09; Aug. 3, 2009; pp. 100-108.

Fyffe, Graham et al., "Comprehensive Facial Performance Capture," Computer Graphics Forum; Apr. 2011; vol. 30, No. 2, pp. 425-434.

Galliani, Silvano et al., "Massively Parallel Multiview Stereopsis by Surface Normal Diffusion," 2015 IEEE International Conference on Computer Vision (ICCV); Dec. 2015; pp. 873-881.

Garland, Michael et al., "Surface Simplification Using Quadric Error Metrics," Proceedings of the 24th Annual Conference on Computer Graphics and Interactive Techniques; Aug. 3, 1997; pp. 209-216.

Garrido, Pablo et al., "Reconstructing Detailed Dynamic Face Geometry from Monocular Video," ACM Trans. Graph. (Proc. SIGGRAPH Asia) 32, 6, Article 158; Nov. 2013, 10 pages.

Garrido, Pablo et al., "Reconstruction of Personalized 3D Face Rigs from Monocular Video," ACM Transactions on Graphics; May 18, 2016; 35(3); pp. 1-5.

Gotardo, Paulo et al., "Practical Dynamic Facial Appearance Modeling and Acquisition," ACM Transactions on Graphics; vol. 37; Issue 6; Nov. 2018; Article No. 232; pp. 1-13.

Guo, Kaiwen et al., "TwinFusion: High Framerate Non-Rigid Fusion through Fast Correspondence Tracking," 2018 IEEE International Conference on 3D Vision; Sep. 5, 2018; pp. 596-605.

Guskov, Igor et al., "Topological Noise Removal," 2001 Graphics Interface Proceedings: Ottawa, Canada; 2001; 25 pages.

Ichim, Alexandru Eugen et al., "Dynamic 3D Avatar Creation from Hand-held Video Input," AACM Transactions on Graphics; Jul. 27, 2015; 34(4), pp. 1-4.

International Electrotechnical Commission, "Safety of Laser Products—Part 1: Equipment Classification and Requirements," (3 ed.). International Electrotechnical Commission; IEC 60825-1:2014; Aug. 2014; 18 pages.

Kazhdan, Michael et al., "Screened Poisson Surface Reconstruction," ACM Transactions on Graphics; Jul. 2013; 32(3); pp. 1-13.

Kowdle, Adarsh et al., "The Need 4 Speed in Real-Time Dense Visual Tracking," ACM Transactions on Graphics; Dec. 4, 2018;37(6); pp. 1-14.

Krähenbühl, Philipp et al., "Efficient Inference in Fully Connected CRFs with Gaussian Edge Potentials," Advances in Neural Information Processing Systems, 24; Oct. 2012; pp. 109-117.

Legendre, Chloe et al., "DeepLight: Learning Illumination for Unconstrained Mobile Mixed Reality," CoRR abs/1904.01175 (2019). arXiv:1904.01175 http://arxiv.org/abs/1904.01175.

(56) References Cited

OTHER PUBLICATIONS

Lempitsky, Victor et al., "Seamless Mosaicing of Image-Based Texture Maps," 2007 IEEE Conference on Computer Vision and Pattern Recognition; Jun. 17, 2007; pp. 1-6.
Li, Guannan et al., "Capturing Relightable Human Performances under General Uncontrolled Illumination," Computer Graphics Forum; May 2013; vol. 32, No. 2pt3; pp. 275-284.
Li, Hao et al., "Robust Single-View Geometry and Motion Reconstruction," ACM Transactions on Graphics (ToG) 28, 5(2009), 175.
Li, Hao et al., "3D Self-Portraits," ACM Transactions on Graphics; Nov. 2013; 32(6); pp. 1-9.
Li, Zhengqin et al., "Materials for Masses: SVBRDF Acquisition with a Single Mobile Phone Image," Proceedings of the European Conference on Computer Vision (ECCV); Apr. 2018; pp. 72-87.
Li, Zhengqin et al., "Learning to Reconstruct Shape and Spatially-varying Reflectance from a Single Image," ACM Transactions on Graphics; Dec. 4, 2018; 37(6); pp. 1-11.
Lincoln, Peter C., "Low Latency Displays for Augmented Reality," Ph.D. Dissertation, The University of North Carolina at Chapel Hill, 2017; 100 pages.
Lombardi, Stephen et al., "Neural Volumes Learning Dynamic Renderable Volumes from Images," ACM Trans. Graph., vol. 338, No. 4; Article 65; Jul. 2019; 14 pages.
Ma, Liqian et al., "Pose Guided Person Image Generation," 31st Conference on Neural Information Processing Systems 2017; Dec. 2017; 11 pages.
Ma, Liqian Met al., "Disentangled Person Image Generation," Proceedings of the IEEE Conference on Computer Vision and Pattern Recognition 2018; Jun. 2018; pp. 99-108.
Martin-Brualla, Ricardo et al., "LookinGood: Enhancing Performance Capture with Real-time Neural Re-Rendering," ACM Trans. Graph., vol. 37, No. 6, Article 255; Nov. 2018; 14 pages.
Meka, Abhimitra et al., "Live User-Guided Intrinsic Video For Static Scene," IEEE Transactions on Visualization and Computer Graphics, vol. 23, No. 11; Nov. 2017; pp. 2447-2454.
Microsoft; 2019; UVAtlas—Isochart Texture Atlasing; <<http://github.com/Microsoft/UVAtlas>>.
Mirdehghan, Parsa et al., "Optimal Structured Light a la Carte," Proceedings of the 2018 IEEE Conference on Computer Vision and Pattern Recognition; Jun. 2018; pp. 6248-6257.
Nam, Giljoo et al., "Practical SVBRDF Acquisition of 3D Objects with Unstructured Flash Photography," ACM Transactions on Graphics (TOG); Dec. 4, 2018; 37(6); pp. 1-12.
Neverova, Natalia et al., "Dense Pose Transfer," Proceedings of the European Conference on Computer Vision (ECCV) 2018; Oct. 2018; pp. 123-138.
Newcobe, Richard A. et al., "DynamicFusion: Reconstruction and Tracking of Non-Rigid Scenes in Real-Time," Proceedings of the IEEE Conference on Computer Vision and Pattern Recognition; Jun. 2015; pp. 343-352.
Orts-Escolano, Sergio et al. "Holoportation: Virtual 3D Teleportation in Real-Time," Proceedings of the 29th Annual Symposium on User Interface Software and Technology; Oct. 16, 2016; pp. 741-754.
Pandey, Rohit et al. "Volumetric Capture of Humans with a Single RGBD Camera via Semi-Parametric Learning," Proceedings of the IEEE/CVF Conference on Computer Vision and Pattern Recognition 2019; Jun. 2019; pp. 9709-9718.
Peers, Pieter et al., "A Reflective Light Stage," USC Institute for Creative Technologies Technical Report; ICT-TR-04.2006; Dec. 23, 2006; 18 pages.
Prada, Fabián et al., "Spatiotemporal Atlas Parameterization for Evolving Meshes," ACM Transactions on Graphics (TOG); Jul. 20, 2017; 36(4); pp. 1-12.
Saito, Shunsuke et al., "Photorealistic Facial Texture Inference Using Deep Neural Networks," Proceedings of the IEEE Conference on Computer Vision and Pattern Recognition; Jul. 2017; pp. 5144-5153.
Sander, Pedro V. et al., "Signal-Specialized Parametrization," In 13th Eurographics Workshop on Rendering: Pisa, Italy; Jun. 2002; pp. 87-98.
Scharstein, Daniel et al., "A Taxonomy and Evaluation of Dense Two-Frame Stereo Correspondence Algorithms," International Journal of Computer Vision 47(1), 2002; pp. 7-42.
Tankovich, Vladimir et al., "SOS: Stereo Matching in O(1) with Slanted Support Windows," 2018 IEEE/RSJ International Conference on Intelligent Robots and Systems (IROS); Oct. 1, 2018; pp. 6782-6789.
Theobalt, Christian et al., "Seeing People in Different Light-Joint Shape, Motion, and Reflectance Capture," IEEE Transactions on Visualization and Computer Graphics; Aug. 20, 2007; 13(4); pp. 663-674.
Thies, Justus et al., "Face2Face: Real-Time Face Capture and Reenactment of RGB Video," Proceedings of the IEEE Conference on Computer Vision and Pattern Recognition; Jun. 2016; pp. 2387-2395.
Wen, Zhen et al., "Face Relighting with Radiance Environment Maps," 2003 IEEE Computer Society Conference on Computer Vision and Pattern Recognition; Jun. 18, 2003; vol. 2, pp. II-158.
Yamaguchi, Shuco et al., "High-Fidelity Facial Reflectance and Geometry Inference from an Unconstrained Image," ACM Transactions on Graphics, 37, 4, Article 162; Jul. 30, 2018; pp. 1-14.
Žbontar, Jure et al., "Stereo Matching by Training a Convolutional Neural Network to Compare Image Patches," Journal of Machine Learning Research; 17(1); Jan. 2016; pp. 1-32.
Zhang, Zhengyou "A Flexible New Technique for Camera Calibration," IEEE Transactions on Pattern Analysis and Machine Intelligence; Nov. 22, 2000; 22(11); pp. 1330-1334.
Zhao, Bo et al., "Multi-View Image Generation from a Single-View," Proceedings of the 26th ACM international Conference on Multimedia; Oct. 15, 2018; pp. 383-391.
Zhou, Kun et al., "Iso-charts: Stretch-driven Mesh Parameterization Using Spectral Analysis," Eurographics Symposium on Geometry Processing; Jul. 8, 20114; pp. 45-54.
Zhou, Kun et al., "TextureMontage: Seamless Texturing of Arbitrary Surfaces From Multiple Images," nACM SIGGRAPH 2005 Papers; Jul. 1, 2005; pp. 1148-1155.
Zollhöfer. Michael et al., "Real-time Non-rigid Reconstruction using an RGB-D Camera," ACM Transactions on Graphics (ToG); Jul. 27, 2014; 33(4); pp. 1-12.
Schönberger, Johannes Lutz et al., "Pixelwise View Selection for Unstructured Multi-View Stereo," European Conference on Computer Vision (ECCV); Oct. 8, 2016; pp. 501-518.
Si, Chenyang Si et al., "Multistage Adversarial Losses for Pose-Based Human Image Synthesis," Proceedings of the IEEE Conference on Computer Vision and Pattern Recognition; Jun. 2018; pp. 118-126.
Simonyan, Karen et al., "Very Deep Convolutional Networks for Large-Scale Image Recognition," Published in International Conference on Learning Representations, 2015; arXiv preprint arXiv:1409.1556; Apr. 2015; 14 pages.
Starck, Jonathan et al., "Surface Capture for Performance-Based Animation," IEEE Computer Graphics and Applications; vol. 27; Issue 3; May-Jun. 2007; pp. 21-31.
Summer, Robert W. et al., "Embedded Deformation for Shape Manipulation," ACM Transactions on Graphics (TOG) Jul. 26, 29, 2007; pp. 80-es.
Sun, Tiancheng et al., "Single Image Portrait Relighting," ACM Transactions on Graphics (Proceedings SIG-GRAPH); 38(4); Jul. 1, 2019; 151 pages.
Debevec, Paul et al., "Efficient View-Dependent Image-Based Rendering with Projective Texture-Mapping," Eurographics Workshop on Rendering Techniques; Vienna; Jun. 1998; pp. 105-116.
International Preliminary Report on Patentability mailed May 27, 2022 for Corresponding International Application No. PCT/US2020/059973, 9 pages.
International Search Report and Written Opinion mailed Feb. 10, 2021 for corresponding International Application No. PCT/US2020/059973, 15 pages.

(56) References Cited

OTHER PUBLICATIONS

Guo, Kaiwen et al., "The Relightables: Volumetric Performance Capture of Humans with Realistic Relighting," ACM Transactions on Graphics, vol. 38, No. 6, Article 217, Nov. 2019; 19 pages.

Meka, Abhimitra et al., "Deep Reflectance Fields: High-Quality Facial Reflectance Field Inference From Color Gradient Illumination," ACM Transactions on Graphics, vol. 38, No. 4, Article 77; Jul. 2019; 12 pages.

\* cited by examiner

VOLUMETRIC PERFORMANCE CAPTURE WITH RELIGHTING

CROSS-REFERENCE TO RELATED APPLICATIONS

The present application is a U.S. National Stage under 35 U.S.C. § 371 of International Patent Application Serial No. PCT/US2020/059973, entitled "VOLUMETRIC PERFORMANCE CAPTURE WITH RELIGHTING" and filed on Nov. 11, 2020, which claims priority to U.S. Provisional Application No. 62/934,320, entitled "THE RELIGHTABLES: VOLUMETRIC PERFORMANCE CAPTURE OF HUMANS WITH REALISTIC RELIGHTING" and filed on Nov. 12, 2019, the entireties of which are incorporated by reference herein.

BACKGROUND

Digital, three-dimensional (3D) representations of humans are employed in applications ranging from photography to avatars in augmented and virtual reality applications. Volumetric capture systems attempt to capture high-quality, photo realistic 3D models of human performers using an array of cameras that are positioned to cover the full capture volume. A green screen is deployed behind the human performer (relative to the camera array) and the 3D model of the human performer is generated under a fixed illumination condition to simplify segmentation and reconstruction of the 3D model. The 3D models of human performers produced by volumetric capture systems have reached a high level of quality. However, the systems struggle to capture high-frequency details of the performers and only recover the fixed illumination condition, which makes the 3D models produced by the volumetric capture systems unsuitable for photorealistic rendering of the human performers in arbitrary scenes under different lighting conditions. Consequently, images rendered using the 3D models of the human performer under illumination conditions that differ from the fixed illumination condition can appear unrealistic or inconsistent with the new setting, e.g., in augmented reality (AR) or mixed reality (MR) applications.

Another approach captures two-dimensional (2D) images of the human performers under multiple illumination conditions such as illuminating the human performer with different combinations of red, green, and blue lighting in different exposures. The 2D images of the human performers generated using the different illumination conditions can be used to render a 2D image of the human performer under an arbitrary illumination condition, i.e., the 2D image is "relightable." As used herein, the terms "relightable" and "relightability" indicate that the 2D image of the human performer acquired or captured under a first set of lighting conditions can be accurately and realistically rendered under a second set of lighting conditions to form a relit 2D image of the human performer that is substantially equivalent to a 2D image of the human performer acquired or captured under the second set of lighting conditions. Although the 2D image capture techniques provide a high degree of photo-realism, they do not estimate the underlying geometry of the human performer and therefore produce a rough proxy rather than an accurate 3D reconstruction. Consequently, the viewpoints that are available for rendering the 2D images are limited and artifacts are generated when rendering new viewpoints.

SUMMARY

According to an aspect, an apparatus comprising:
a plurality of lights configured to project alternating spherical color gradient illumination patterns onto an object or human performer at a predetermined frequency;
a plurality of cameras configured to capture images of an object or human performer corresponding to the alternating spherical color gradient illumination patterns;
a plurality of depth sensors to capture depth maps of the object or human performer at the predetermined frequency; and
at least one processor that implements a machine learning algorithm to produce a three-dimensional (3D) model of the object or human performer comprising relighting parameters used to relight the 3D model under different lighting conditions.

According to some aspects, the apparatus may comprise one or more (e.g., all) of the following features (or any combination thereof).

The plurality of lights may be configured to project the alternating spherical color gradient illumination patterns as complementary gradients in different color bands that sum to white light.

Also, the plurality of lights may be configured to generate a left-to-right gradient in an intensity of a first color light projected onto the object or human performer in a first time interval and a right-to-left gradient in the intensity of the first color light in a second time interval, a front-to-back gradient in the intensity of a second color light projected onto the object or human performer in the first time interval and a back-to-front intensity of the second color light in the second time interval, and a top-to-bottom gradient in the intensity of a third color light projected onto the object or human performer in the first time interval and a bottom-to-top gradient in the intensity of the third color light in the second time interval.

A sum of the intensities of the first, second, and third color light over the first time interval and the second time interval may produce white light illumination of the object or human performer.

The predetermined frequency may be 60 Hz.

The plurality of cameras may comprise a plurality of red-green-blue (RGB) cameras.

Each depth sensor of the plurality of depth sensors may comprise:
a vertical cavity surface emitting laser (VCSEL) that projects a structured pattern of infrared (IR) light onto the object or human performer; and
a stereo pair of IR cameras to capture reflections of the structured IR light.

The at least one processor may be configured to construct the depth map of the object or human performer from images captured by the stereo pair of IR cameras.

The machine learning algorithm may be configured to generate silhouettes of the object or human performer by performing segmentation on the images and depth map.

The machine learning algorithm may be configured to generate and track a mesh that represents the 3D model of the object or human performer based on the silhouettes and a 3D geometry generated by the plurality of cameras and the plurality of depth sensors.

The relighting parameters may comprise at least one of albedos, surface normals, shininess, and ambient occlusion maps of polygons in the mesh that represents the 3D model of the object or human performer.

The at least one processor may be configured to use the surface normals to polygons in the mesh to increase a resolution of the polygons that represent the mesh.

The plurality of cameras and the plurality of depth sensors may be configured to generate a clean plate sequence of images and depths in the absence of the object or human performer.

The machine learning algorithm may be configured to generate and track the mesh by performing background subtraction of the clean plate sequence from the images and depth map captured while the object or performer is illuminated by the plurality of lights.

The at least one processor may be configured to perform mesh alignment to align nodes in the meshes that represent the object or human performer in a sequence of keyframes captured by the plurality of cameras and the plurality of depth sensors.

The at least one processor may be configured to identify transitions from a single mesh to multiple meshes representing multiple objects or human performers.

According to an aspect a method comprising:
projecting alternating spherical color gradient illumination patterns onto an object or human performer at a predetermined frequency;
capturing images of an object or human performer corresponding to the alternating spherical color gradient illumination patterns using a plurality of cameras;
capturing depth maps of the object or human performer at the predetermined frequency using a plurality of depth sensors; and
producing, using a machine learning algorithm, a three-dimensional (3D) model of the object or human performer comprising relighting parameters used to relight the 3D model under different lighting conditions.

According to some aspects, the method may comprise one or more (e.g., all) of the following features (or any combination thereof).

The projecting alternating spherical color gradient illumination patterns onto an object or human performer at a predetermined frequency may be achieved by using a plurality lights.

Projecting the alternating spherical color gradient illumination patterns may comprise projecting the alternating spherical color gradient illumination patterns as complementary gradients in different color bands that sum to white light.

Projecting the alternating spherical color gradient illumination patterns may comprise generating a left-to-right gradient in an intensity of a first color light projected onto the object or human performer in a first time interval and a right-to-left gradient in the intensity of the first color light in a second time interval, a front-to-back gradient in the intensity of a second color light projected onto the object or human performer in the first time interval and a back-to-front intensity of the second color light in the second time interval, and a top-to-bottom gradient in the intensity of a third color light projected onto the object or human performer in the first time interval and a bottom-to-top gradient in the intensity of the third color light in the second time interval.

A sum of the intensities of the first, second, and third color light over the first time interval and the second time interval may produce white light illumination of the object or human performer.

The predetermined frequency may be 60 Hz.

The plurality of cameras may comprise a plurality of red-green-blue (RGB) cameras.

Capturing the depth maps may comprise:
projecting, from a plurality of vertical cavity surface emitting lasers (VCSELs), structured patterns of infrared (IR) light onto the object or human performer; and
capturing reflections of the structured IR light using a stereo pair of IR cameras.

The method may further comprise:
constructing the depth map of the object or human performer from images captured by the stereo pair of IR cameras.

The method may further comprise:
generating, using the machine learning algorithm, silhouettes of the object or human performer by performing segmentation on the images and depth map.

The method may further comprise:
generating and tracking, using the machine learning algorithm, a mesh that represents the 3D model of the object or human performer based on the silhouettes and a 3D geometry generated by the plurality of cameras and the plurality of depth sensors.

The relighting parameters may comprise at least one of albedos, surface normals, shininess, and ambient occlusion maps of polygons in the mesh that represents the 3D model of the object or human performer.

The method may further comprise:
increasing a resolution of the polygons that represent the mesh using the surface normals to polygons in the mesh.

The method may further comprise:
generating, using the plurality of cameras and the plurality of depth sensors, a clean plate sequence of images and depths in the absence of the object or human performer.

The method may further comprise:
performing background subtraction of the clean plate sequence from the images and depth map captured while the object or performer is illuminated by the plurality of lights.

The method may further comprise:
performing mesh alignment to align nodes in the meshes that represent the object or human performer in a sequence of keyframes captured by the plurality of cameras and the plurality of depth sensors.

The method may further comprise:
identifying transitions from a single mesh to multiple meshes representing multiple objects or human performers.

According to an aspect, a non-transitory computer readable medium embodying a set of executable instructions, the set of executable instructions to manipulate at least one processor to:
access images of an object or human performer captured by a plurality of cameras using alternating spherical color gradient illumination patterns;
access depth maps of the object or human performer captured by a plurality of depth sensors at the predetermined frequency;
produce, using a machine learning algorithm, a three-dimensional (3D) model of the object or human performer comprising relighting parameters used to relight the 3D model under different lighting conditions; and
store the 3D model comprising the relighting parameters.

According to some aspects, the set of executable instructions may comprise one or more (e.g., all) of the following features (or any combination thereof).

The set of executable instructions may manipulate the at least one processor to control a plurality lights to project alternating spherical color gradient illumination patterns onto an object or human performer at a predetermined frequency.

The set of executable instructions may manipulate the at least one processor to:

construct the depth map of the object or human performer from images captured by a stereo pair of IR based on structured patterns of infrared (IR) light projected onto the object or human performer by a plurality of vertical cavity surface emitting lasers (VCSELs).

The set of executable instructions may manipulate the at least one processor to:

generate, using the machine learning algorithm, silhouettes of the object or human performer by performing segmentation on the images and depth map.

The set of executable instructions may manipulate the at least one processor to:

generate and track, using the machine learning algorithm, a mesh that represents the 3D model of the object or human performer based on the silhouettes and a 3D geometry generated by the plurality of cameras and the plurality of depth sensors, wherein the relighting parameters comprise at least one of albedos, surface normals, shininess, and ambient occlusion maps of polygons in the mesh that represents the 3D model of the object or human performer.

The set of executable instructions may manipulate the at least one processor to:

increase a resolution of the polygons that represent the mesh using the surface normals to polygons in the mesh.

The set of executable instructions may manipulate the at least one processor to:

access a clean plate sequence of images and depths captured in the absence of the object or human performer by the plurality of cameras and the plurality of depth sensors.

The set of executable instructions may manipulate the at least one processor to:

perform background subtraction of the clean plate sequence from the images and depth map captured while the object or performer is illuminated by the plurality of lights.

The set of executable instructions may manipulate the at least one processor to:

perform mesh alignment to align nodes in the meshes that represent the object or human performer in a sequence of keyframes captured by the plurality of cameras and the plurality of depth sensors.

The set of executable instructions may manipulate the at least one processor to:

identify transitions from a single mesh to multiple meshes representing multiple objects or human performers.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
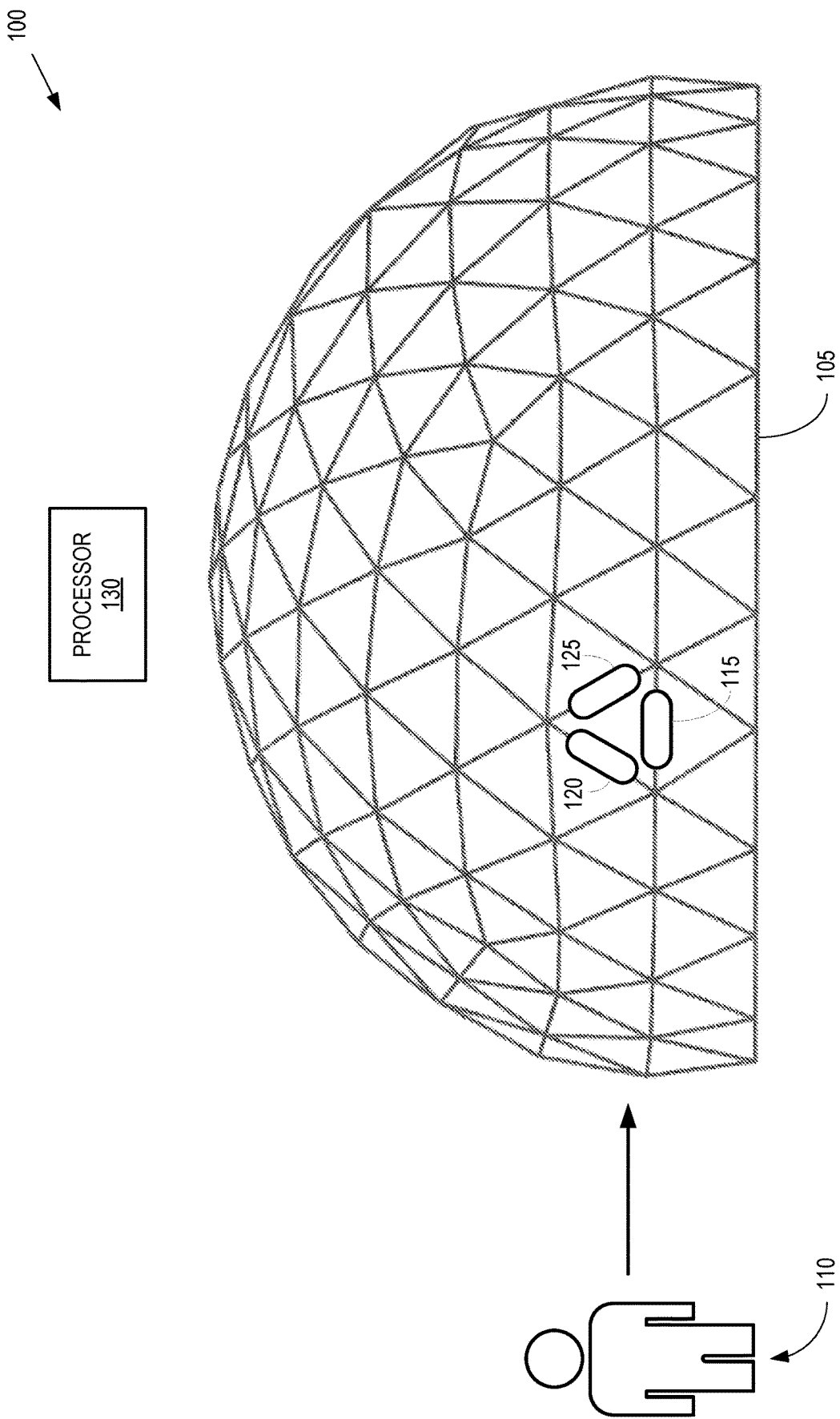
FIG. 1 is a block diagram of a volumetric capture system that illuminates objects or human performers and captures images and depth maps of the objects or human performers according to some embodiments.

FIGS. 1-9 disclose embodiments of a volumetric capture pipeline that produces true photorealism, relightability, and high-frequency detail includes a light stage that projects alternating spherical color gradient illumination patterns onto an object or human performer at a predetermined frequency such as 60 Hz. Light reflected from the object or human performer is captured by an array of cameras, such as red-green-blue (RGB) cameras that capture color images of the object or human performer corresponding to the alternating spherical color gradient illumination patterns. The light stage also includes depth sensors to capture high-resolution depth maps of the object or human performer at the predetermined frequency. Some embodiments of the depth sensors are implemented using a structured light illuminator (such as a vertical cavity surface emitting laser, VCSEL) that projects a structured pattern of infrared (IR) light onto the object or human performer and a stereo pair of IR cameras to capture reflections of the structured IR light. The depth map is constructed from the images captured by the pair of IR cameras. Instead of a green screen, machine learning is used to perform segmentation on the color images and depth map to create precise silhouettes of the object or human performer. The silhouettes are combined with the 3D geometry generated by the IR and RGB cameras to generate and track a mesh that represents a 3D model of the object or human performer. In some embodiments, the machine learning algorithm produces a mesh of polygons (such as triangles) that represent the 3D model. Parameters including albedos, surface normals, shininess, and ambient occlusion maps are generated from the two spherical gradient illumination images available for the mesh. Relighting of the 3D model can then be performed based on these parameters.

In some embodiments, deep learning segmentation is performed based on a clean plate sequence of images and depths captured by the IR and RGB cameras before the object or human performer enters the light stage. For example, the clean plate sequence can include 50 frames and a depth map can be computed for each frame and camera. Each RGB camera produces an RGB image that is aligned with a corresponding depth image generated using a structured light illuminator and stereo pair of IR cameras. The mesh that represents the 3D model is generated based on the color images/depths captured while the object or human performer is illuminated by the RGB cameras and depth sensors. The clean plate sequence is then used to perform background subtraction, e.g., retrieving the object or human performer and ignoring the light stage. Mesh alignment is performed to align the nodes in the meshes that represent the object or human performer in the sequence of key frames captured by the RGB cameras and depth sensors. In some embodiments, a keyframe selection algorithm implements a Markov random field (MRF) technique to identify transitions from a single mesh to multiple meshes representing multiple objects or human performers. For example, the keyframe selection algorithm generates a separate mesh when a human performer removes a jacket.

In some embodiments, the alternating spherical gradient images generate complementary gradients in different color bands that sum to white light. For example, during a first time interval, a gradient in the intensity of red light projected onto the object or human performer in a first time interval varies from bright (on the left of the light stage) to dim (on the right of the light stage). Gradients in the intensities of green light vary from top to bottom of the light stage and gradients in the intensities of blue light vary from front to back of the light stage. The inverses of these color gradients are produced by the light stage during a second time interval. A sum of the intensities of the red, green, and blue light over the first time interval and the second time interval produces white light illumination of the object or human performer on the light stage. Images of the object or human performer captured under the different lighting conditions are used to produce measures of the color, orientation, and roughness of the polygons or triangles that make up the mesh. For example, summing the images over multiple time intervals produces surface color values (or reflectances). Subtracting the images in the time intervals corresponding to different gradients and dividing by the sum of the images generates a measure of the surface orientation (e.g., a vector normal to the surface of a mesh polygon or triangle). A measure of the surface roughness is also determined by combining the images in the intervals corresponding to different gradients. These measures correspond to, or are used to generate, the mesh parameters including albedos, surface normals, shininess, and ambient occlusion maps.

FIG. 1 is a block diagram of a volumetric capture system 100 that illuminates objects or human performers and captures images and depth maps of the objects or human performers according to some embodiments. The volumetric capture system 100 includes a light stage 105 that is implemented as a geodesic dome in some embodiments. However, other geometries are used to implement the light stage 105 in other embodiments. Operation of the volumetric capture system 100 is disclosed herein in the context of a human performer 110 who enters the light stage 105 and performs various actions while moving around within the light stage 105. However, the volumetric capture system 100 is also used to capture images and depth maps of objects separate from, carried by, or associated with the human performer 110. For example, the volumetric capture system 100 can be used to capture images and depth maps of objects such as chairs or tables, a basketball carried by the human performer 110, clothing worn by the human performer 110, and the like.

The volumetric capture system 100 includes an array of programmable light units 115 (only one shown in FIG. 1 in the interest of clarity), an array of cameras 120 (only one shown in FIG. 1 in the interest of clarity) used to capture images based on the light generated by the programmable light units 115, and an array of depth sensors 125 (only one shown in FIG. 1 in the interest of clarity) used to generate depth maps of the human performer 110 while in the light stage 105. Some embodiments of the depth sensors include infrared (IR) structured light illuminators such as a vertical cavity surface emitting laser (VSCEL) and a stereo pair of IR cameras that detect the structured light reflected from the human performer 110. For example, the volumetric capture system 100 can include three hundred and thirty-one programmable light units 115, fifty-eight red-green-blue (RGB) cameras 120, and sixteen depth sensors 125 that each include sixteen IR structured light projectors and thirty-two IR cameras. The array of programmable light units 115, the array of cameras 120, and the array of depth sensors 125 are distributed substantially symmetrically and uniformly around the light stage 105.

In operation, the array of programmable light units 115 project alternating spherical color gradient illumination patterns onto the human performer 110 at a predetermined frequency such as 60 Hz. The array of programmable light units 115 can also project the alternating spherical color gradient illumination patterns onto an empty light stage 105 (e.g., in the absence of the human performer 110 or other objects) to generate a clean slate sequence for background subtraction and segmentation, as discussed herein. The array of cameras 120 is synchronized with the array of programmable light units 115 and captures images of the human performer 110 corresponding to the alternating spherical color gradient illumination patterns. The array of depth sensors 125 captures depth maps of the human performer 115 at the predetermined frequency. The lighting stage 105 also includes (or is associated with) one or more processors 130 that implement a machine learning algorithm to produce a three-dimensional (3D) model of the human performer 110 based on the images captured by the array of cameras 120 and the depth maps captured by the array of depth sensors 125. The 3D model includes relighting parameters used to relight the 3D model under different lighting conditions.

Figure 2:
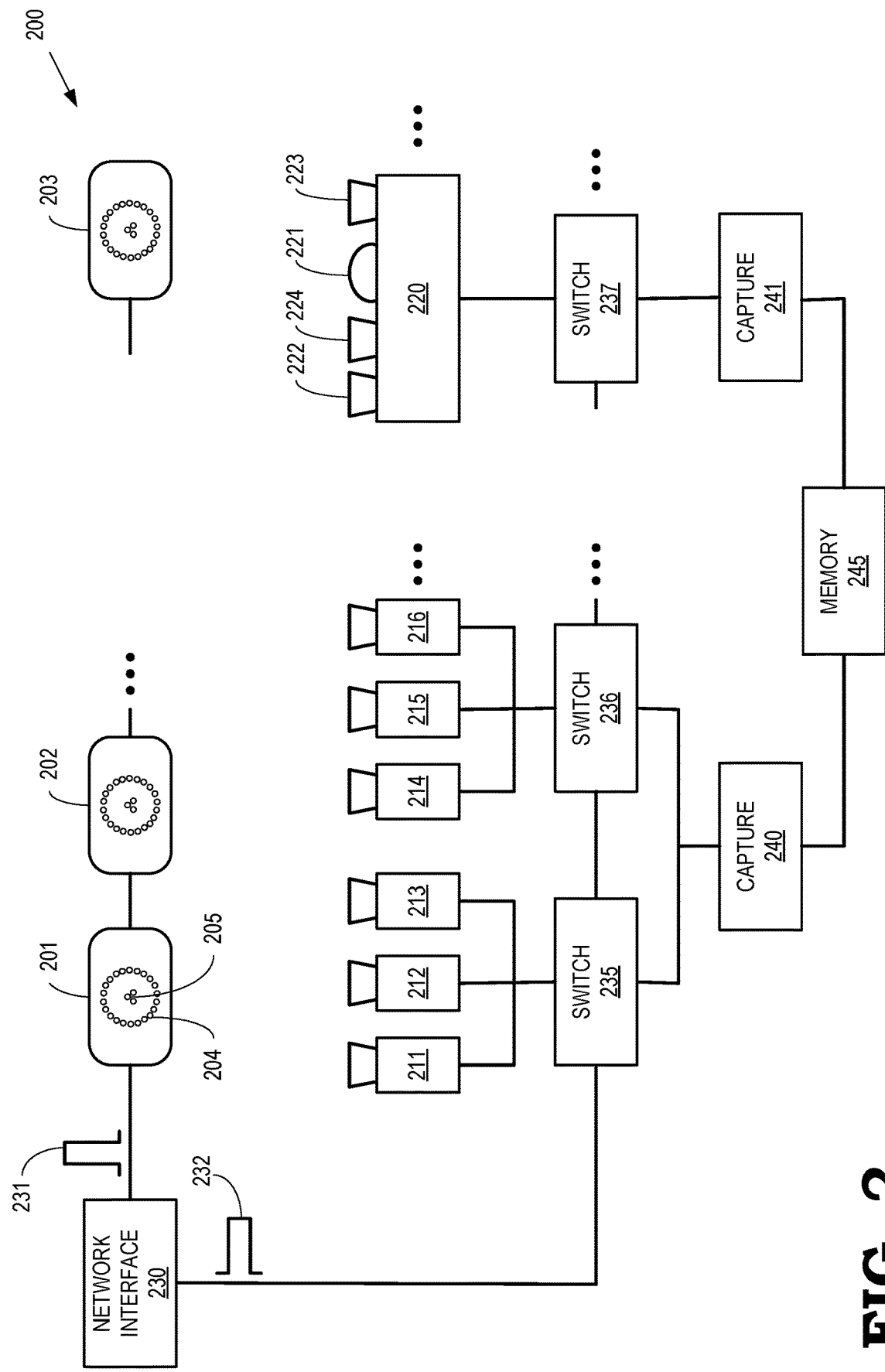
FIG. 2 is a block diagram of a hardware system architecture that is used to perform volumetric capture according to some embodiments.

FIG. 2 is a block diagram of a hardware system architecture 200 that is used to perform volumetric capture according to some embodiments. The hardware system architecture 200 is implemented in some embodiments of the volumetric capture system 100 shown in FIG. 1. The hardware system architecture 200 includes a daisy-chained network of programmable light units 201, 202, 203 (collectively referred to herein as "the programmable light units 201-203"), RGB cameras 211, 212, 213, 214, 215, 216 (collectively referred to herein as "the RGB cameras 211-216"), and depth sensors 220 (only one shown in FIG. 2 in the interest of clarity). In the illustrated embodiment, the programmable light units 201-203 include outer rings 204 of face-optimized light emitting diodes (LED) that have a narrow field of illumination (FOI) and a central region 205 of body-optimized LEDs that have a wide FOI. In the illustrated embodiment, the depth sensor 220 includes a structured IR illuminator 221, a stereo pair of IR cameras 222, 223, and an RGB camera 224 that captures images in conjunction with the RGB cameras 211-216.

A network interface 230 maintains a clock and provides synchronization signals 231, 232 that are used to synchronize the programmable light units 201-203, the RGB cameras 211-216, and the depth sensor 220. In some embodiments, the clock maintained by the network interface 230 runs at a predetermined frequency such as 60 Hz. The synchronization signals 231, 232 are provided over signaling pathways that are implemented using peripheral component interface (PCI, PCIe) ribbon cables or other fibers, switching fabrics, cabling, and the like. The synchronization signals 231, 232 are provided to switches 235, 236, 237 (collectively referred to herein as "the switches 235-237") that are implemented as PCI switches in the illustrated embodiment. The switches 235-237 use the synchronization signals 231, 232 to trigger operation of the programmable light units 201-203, the RGB cameras 211-216, and the depth sensor(s) 220. The switches 235-237 provide the images and depth maps captured by the RGB cameras 211-216 and the depth sensor 220 to one or more "capture" processors 240, 241 that are configured to capture the images and depth maps, which are then stored in one or more memories 245.

In response to a triggering signal provided by the switches 235, 236, the programmable light units 201-203 project alternating spherical color gradient illumination patterns onto a human performer at the predetermined frequency, e.g., 60 Hz. In some embodiments, the spherical color gradient illumination patterns alternate between a first pattern having a first gradient in one or more colors (in a first time interval) and a second pattern having a second gradient in the one or more colors (in a second time interval). For example, the programmable light units 201-203 can project the alternating spherical color gradient illumination patterns as complementary gradients in different color bands that sum to white light when averaged over two or more time intervals. If the programmable light units 201-203 generate three colors, such as red, green, and blue, the programmable light units 201-203 can generate a left-to-right gradient (e.g., along an X-axis measured relative to an orientation of a light stage such as the light stage 105 shown in FIG. 1) in an intensity of a first color light (such as red) in a first time interval and a right-to-left gradient in the intensity of the first color light in a second time interval, a front-to-back gradient (e.g., along a Y-axis) in the intensity of a second color light (such as green) in the first time interval and a back-to-front intensity of the second color light in the second time interval, and a top-to-bottom gradient (e.g., along a Z-axis) in the intensity of a third color light (such as blue) in the first time interval and a bottom-to-top gradient in the intensity of the third color light in the second time interval. A sum of the intensities of the first, second, and third color light over the first time interval and the second time interval produces white light illumination within the light stage.

Figure 3:
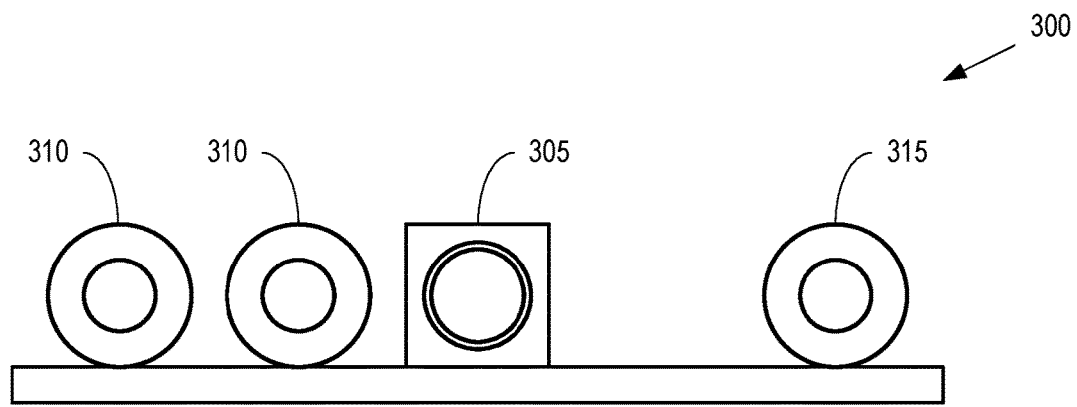
FIG. 3 is a block diagram of a depth sensor according to some embodiments.

FIG. 3 is a block diagram of a depth sensor 300 according to some embodiments. The depth sensor 300 is used to implement some embodiments of the depth sensors 125 shown in FIG. 1 and the depth sensors 220 shown in FIG. 2. The depth sensor 300 includes an active illuminator 305, a stereo pair of IR cameras 310, 315, and an RGB camera 320. Some embodiments of the depth sensor 300 do not include the RGB camera 320. The final depth determined using images captured by the stereo pair of IR sensors 310, 315 using reflected light generated by the active illuminator 305 are projected to a viewpoint of the RGB camera 320 (if present in the depth sensor 300). In the illustrated embodiment, the active illuminator 305 is a structured light illuminator implemented using a VCSEL.

Figure 4:
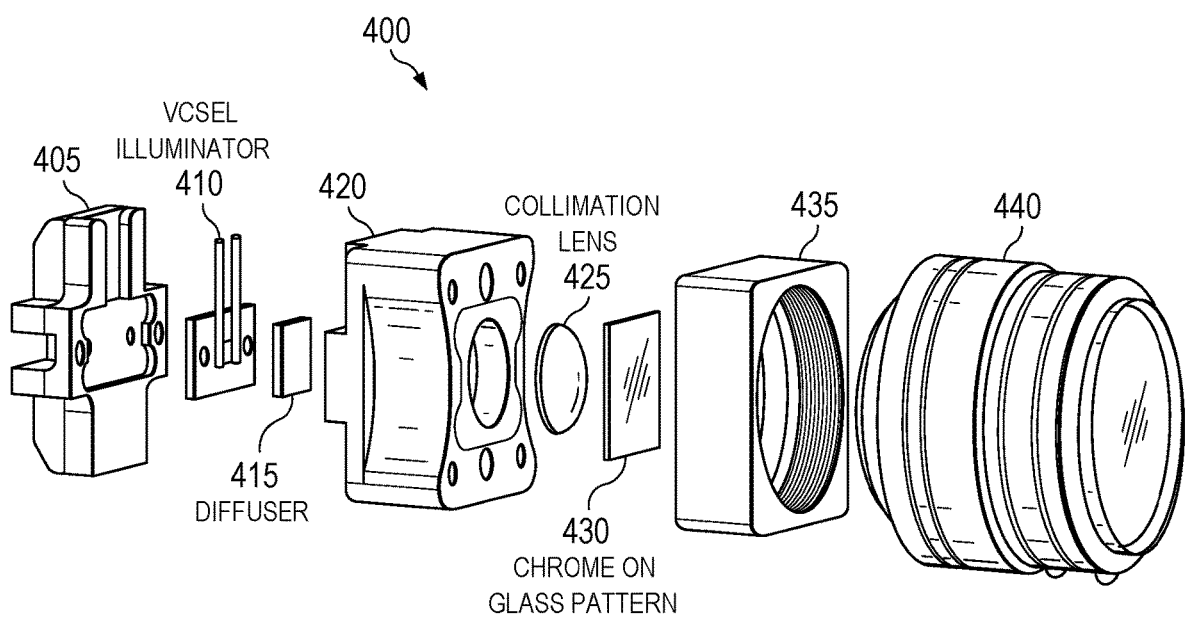
FIG. 4 illustrates a structured light illuminator that provides structured infrared (IR) illumination on a light stage according to some embodiments.

FIG. 4 illustrates a structured light illuminator 400 that provides structured IR illumination on a light stage according to some embodiments. The structured light illuminator 400 is used to implement some embodiments of the active illuminator 305 shown in FIG. 3. In the illustrated embodiment, the structured light illuminator 400 includes a mount 405, a VCSEL illuminator 410, a diffuser 415, a casing 420, a collimator lens 425, a chrome-on-glass pattern 430, a lens mount 435, and a projection lens 440. The VCSEL illuminator 410 emits light at a predetermined IR wavelength such as 860 nm. As the light travels from left to right it is diffused in the diffuser 415, collimated by the collimator lens 425, patterned by the chrome-on-glass pattern 430 and then projected onto a light stage by the projection lens 440. The selection of the pattern detail and the projection lens 440 determines the effective resolution and field-of-view (FOV) of the structured light illuminator 400. In the illustrated embodiment, the chrome-on-glass pattern 430 produces a dense pattern of features that matches the resolution of a corresponding cameras, such as the stereo pair of IR cameras 310, 315 shown in FIG. 3. The projection lens 440 is used to match the FOI to the FOV of the corresponding cameras.

Figure 5:
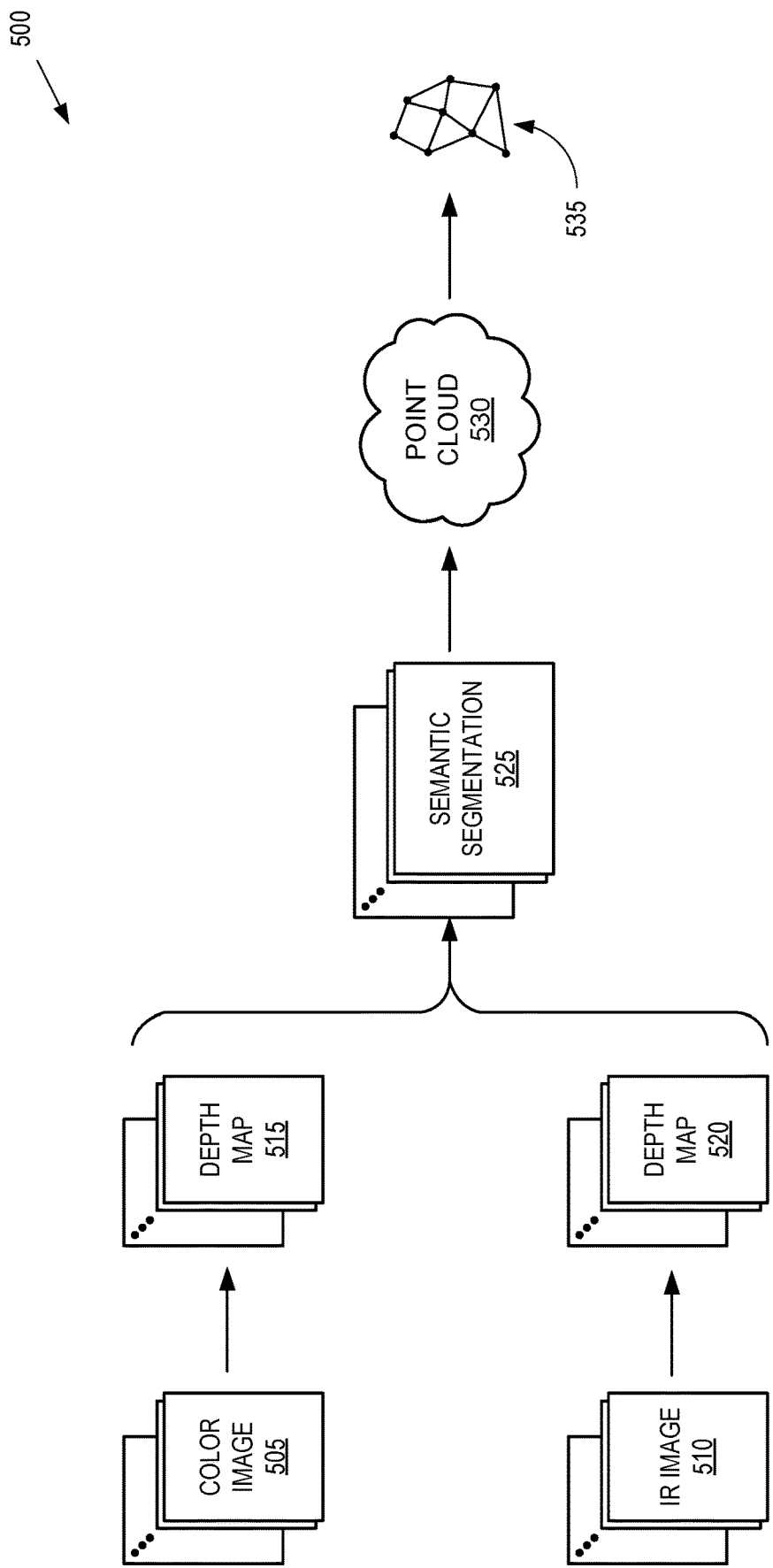
FIG. 5 is a block diagram of a first portion of a volumetric reconstruction pipeline that constructs a 3D model based on input images received from an array of red green blue (RGB) cameras and an array of depth sensors according to some embodiments.

FIG. 5 is a block diagram of a first portion of a volumetric reconstruction pipeline 500 that constructs a 3D model based on input images received from an array of RGB cameras and an array of depth sensors according to some embodiments. The volumetric reconstruction pipeline 500 is implemented in one or more processors such as the processor 130 shown in FIG. 1 and the capture processors 240, 241 shown in FIG. 2.

The processor that implements the volumetric reconstruction pipeline 500 receives a set of color images 505 that are captured by an array of cameras such as the cameras 120 shown in FIG. 1, the cameras 211-216, 224 shown in FIG. 2, and the camera 310 shown in FIG. 3. The color images 505 are captured at a predetermined frequency such as 60 Hz in response to programmable lighting units providing alternating gradient light patterns, as discussed herein. The processor also receives IR images 510 from an array of depth sensors such as the depth sensors 125 shown in FIG. 1, the depth sensor 220 shown in FIG. 2, and the depth sensor 300 shown in FIG. 3. The color images 505 and the IR images 510 are synchronized, e.g., using the synchronization signals 231, 232 generated by the network interface 230 shown in FIG. 2.

The processor generates depth maps 515, 520 based on the color images 505 and the IR images 510. Although the depth sensors generate high-quality depth maps 520, the quality of the depth maps 520 can be reduced or generate an incorrect estimate due to a low signal-to-noise ratio (SNR), highly reflective surfaces, or other effects. Some embodiments of the processor therefore implement a multi-view stereo algorithm that runs independently on the color images 505 and the IR images 510 to generate the depth maps 515, 520. The multi-view triangulation scheme performs operations including view selection, matching cost computations, disparity optimization, and refinement. The depth maps 515, 520 are then aligned and fused. In some embodiments, each of the IR depth maps 520 is aligned with one of the color depth maps 515 that corresponds to an RGB view. For example, each depth map 520 generated by an IR camera is projected to the closest RGB camera.

Segmentation is performed on the images 505, 510 and the corresponding depth maps 515, 520 to separate the human performer from the background. The light stage disclosed herein (e.g., the light stage 105 shown in FIG. 1) uses dynamic illumination and image capture is performed by lighting and cameras that surround the human performer. Thus, conventional green screen techniques are difficult to implement. For example, many cameras and lights would protrude from the green screen, which significantly complicates estimation of a dense matte. Furthermore, the green screen would cause significant color spill onto the subject, which would interfere with estimation of the reflectance maps for the human performer. Consequently, instead of a green screen, a machine learning algorithm implemented in the processor performs deep learning-based segmentation and subtraction using the images 505, 510 and the corresponding depth maps 515, 520.

The machine learning algorithm creates a semantic segmentation 525 by comparing the acquired images 505, 510 and depth maps 515, 520 to a clean plate sequence of images and depth maps that are acquired from an empty light stage. In some embodiments, the clean plate sequence includes a sequence of 50 frames acquired prior to the human performer entering the light stage or after the human performer has exited the light stage. For each frame and camera, a depth map is computed and the average over all depth maps is stored as $D_{av\partial}$. At test time, each RGB camera has a depth image D, aligned with an RGB image I, which is used to compute the following unary term:

$$\psi(D,I) = w1\psi_d(Dav\partial, D) + w2\psi_r\partial b \qquad (I),$$

where $\psi_d(D_{av\partial} \rightarrow D)$ is defined by evaluating the logistic function on the distance between the current observation D and the average depth $D_{av\partial}$. The term $\psi_{r\partial b}(I)$ is the confidence of the semantic segmentation network. The unary term can be refined by solving a CRF that introduces a pairwise potential term to enforce smoothness across neighboring pixels.

The semantic segmentation 525 including the segmented depth maps is projected to 3D to generate a point cloud 530 in the coordinate system of the light stage. In some embodiments, an iterative closest point (ICP) bundle adjustment is applied to register the point cloud 530 from multiple views. Each point is then projected to a locally fitted plane produced by a moving least-squares projection that compensates for any remaining non-rigid alignment errors. Poisson reconstruction is then used to generate a triangular mesh 535 that represents the 3D model of the human performer.

Figure 6:
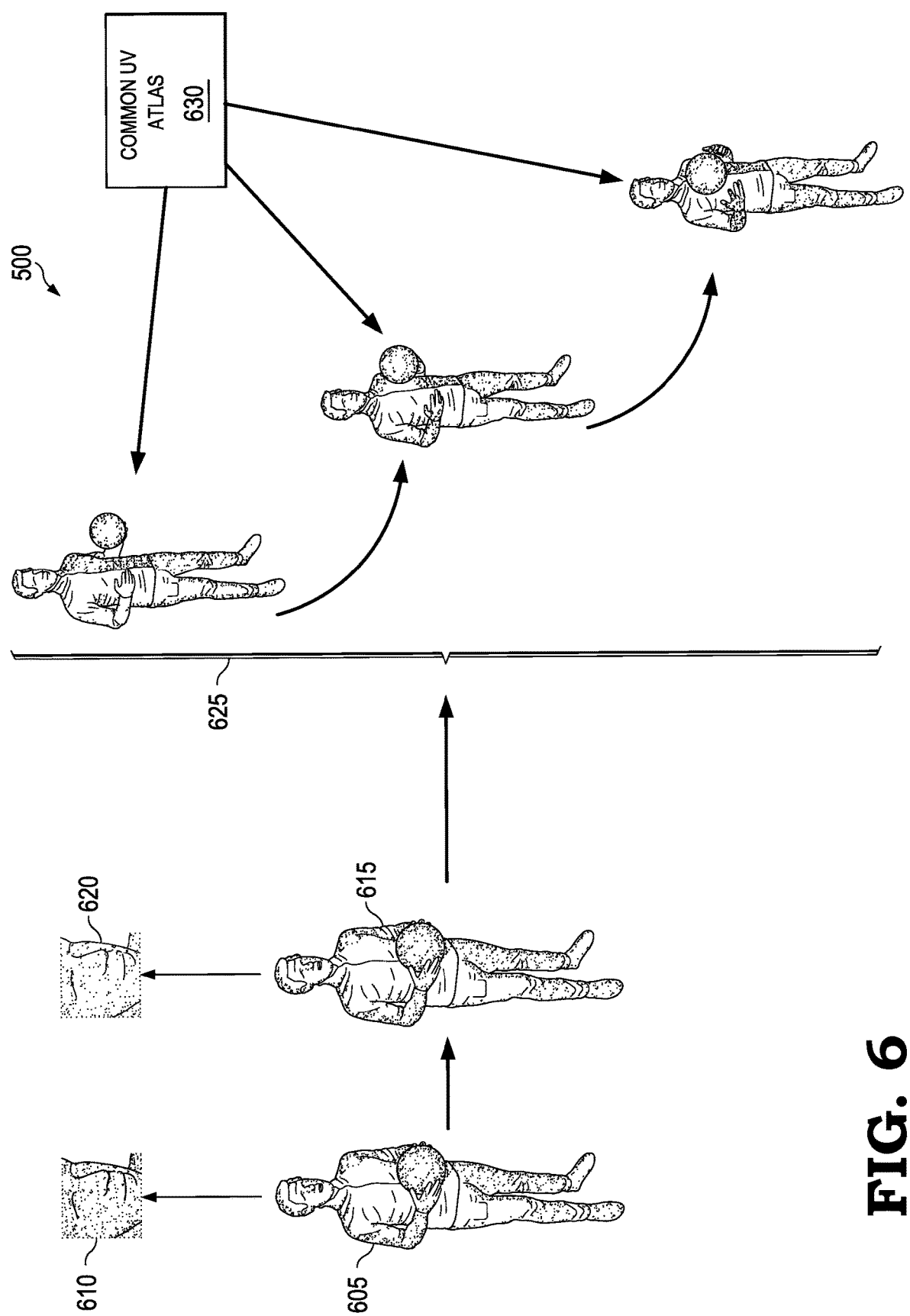
FIG. 6 is a block diagram of a second portion of the volumetric reconstruction pipeline according to some embodiments.

FIG. 6 is a block diagram of a second portion of the volumetric reconstruction pipeline 500 according to some embodiments. A mesh reconstruction 605 of the human performer corresponds to the mesh 535 produced in the first portion of the volumetric reconstruction pipeline 500 shown in FIG. 5. A zoom-in 610 of the mesh reconstruction 605 illustrates the details in the face of the human performer. The mesh reconstruction 605 is downsampled to generate a simplified mesh reconstruction 615. A zoom-in 620 of the simplified mesh reconstruction 615 illustrates the downsampled details in the face of the human performer. In some embodiments, decimation is run on the mesh reconstruction 605 to reduce the number of facets and remove artifacts to produce the simplified mesh reconstruction 615. Any remaining mesh islands and surface degeneracies can be removed by collapsing edges.

The machine learning algorithm implemented in the processor tracks the mesh reconstruction 615 over time through a sequence 625 of mesh representations. Frame-to-frame alignment of the independently reconstructed meshes in the sequence 625 is performed using an embedded deformation graph representation to parameterize the deformation of one mesh so that it can be aligned with another mesh. In some embodiments, sequential alignment algorithms are used to perform global mesh alignment of the meshes in the sequence 625. For example, proceeding forward in time, each mesh is sequentially aligned to all its proceeding meshes. Proceeding backward in time, each mesh is sequentially aligned to all its preceding meshes. This procedure generates a matrix of aligned meshes and an alignment error matrix of entries that contain misalignment measures between meshes aligned with the different frames. In some embodiments, an MRF procedure is used to minimize the number of keyframes used to represent the sequence 625.

The aligned, topologically consistent sequence of meshes is not always sufficient to render high-quality geometrical details. Thus, the sequence of meshes can be parameterized so that details can be separated from the base geometry using a displacement texture mapping UV space. The parameterization is performed using conventional techniques such as the Microsoft UVAtlas software package. In the illustrated embodiment, the sequence 625 is subdivided into groups that have the same mesh topology. The meshes within a group share a common UV parameterization to enforce temporal and spatial consistency. The UV parameterizations are stored in a common UV atlas 630.

Figure 7:
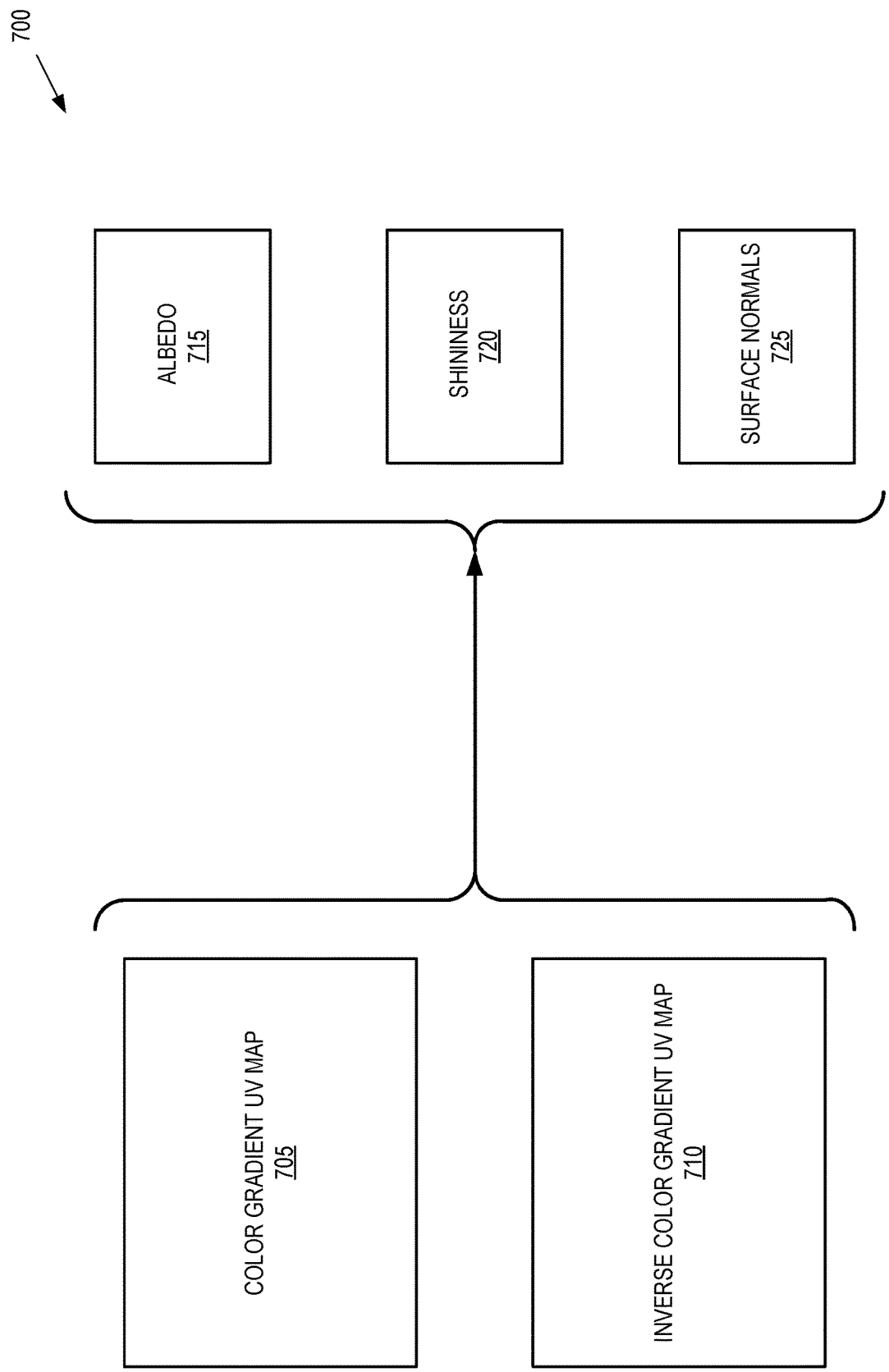
FIG. 7 is a block diagram of a computation of relighting parameters of a human performer determined based upon gradient UV maps according to some embodiments.

FIG. 7 is a block diagram of a computation 700 of relighting parameters of a human performer determined based upon gradient UV maps according to some embodiments. The computation 700 uses images from the color cameras in the mesh UV space that are blended using Poisson blending, with the contribution of each camera weighted by the dot product of the surface normal and the view vector. Occluded cameras are excluded at each point in UV space and alternating frames contain either the color gradient illumination or the inverse color gradient illumination, as discussed herein. The computation 700 therefore operates on a color gradient UV map 705 and an inverse color gradient UV map 710, which are indicated by the symbols $G^+$ and $G^-$, respectively.

A reflectance estimate is calculated using the color gradient $G^+$ and inverse color gradient $G^-$ lighting conditions for the RGB color channels as follows:

$$G_r^+ = \left(\frac{1}{2} + \frac{1}{2}\Theta_x\right)L;$$

$$G_g^+ = \left(\frac{1}{2} + \frac{1}{2}\Theta_y\right)L;$$

$$G_b^+ = \left(\frac{1}{2} + \frac{1}{2}\Theta_z\right)L;$$

$$G_r^- = \left(\frac{1}{2} - \frac{1}{2}\Theta_x\right)L;$$

$$G_g^- = \left(\frac{1}{2} - \frac{1}{2}\Theta_y\right)L;$$

$$G_b^- = \left(\frac{1}{2} - \frac{1}{2}\Theta_z\right)L,$$

in the above equations, $\Theta \in S^2$ represents the direction of the subject to the (presumed distant) light, L represents the overall intensity, and the subscripts indicate red, green, or blue light. The sum of the color gradient and the inverse color gradient images includes the albedo at each pixel and the difference between the two images encodes the overall reflected direction of the reflectance (times the albedo).

In the illustrated embodiment, the albedos (o) 715, the shininess (s) 720, and the surface normals (n) 725 to the pixels in the mesh are computed using the following:

$$\beta = \frac{3}{2}\left(|d| - \frac{1}{3}\right) \text{ with } d_{i \in \{x,y,z\}} = \frac{g_i^+ - g_i^-}{g_i^+ + g_i^-};$$

$$s = \beta^{(1-\alpha)} \text{ with } \alpha = \min(1, \cos^{-1}(n \cdot n^m));$$

-continued $$o = \beta^\alpha;$$

$$a = \frac{g^+ + g^- - \langle r_0, r_0, r_0 \rangle}{(1-o)(1-r_0)};$$

$$n = \frac{d}{|d|};$$

in the above equations, the symbols $g^+$ and $g^-$ are the color gradient illumination pixels and inverse color gradient illumination pixels, respectively, blended over all non-occluded views, $r_0=0.04$ is an approximate dielectric Fresnel term at normal incidents, and $n^m$ is the mesh normal. Once calculated, the relighting parameters are stored in a memory with the 3D model, which is subsequently accessed to perform relighting of the 3D model in different ambient light conditions.

Figure 8:
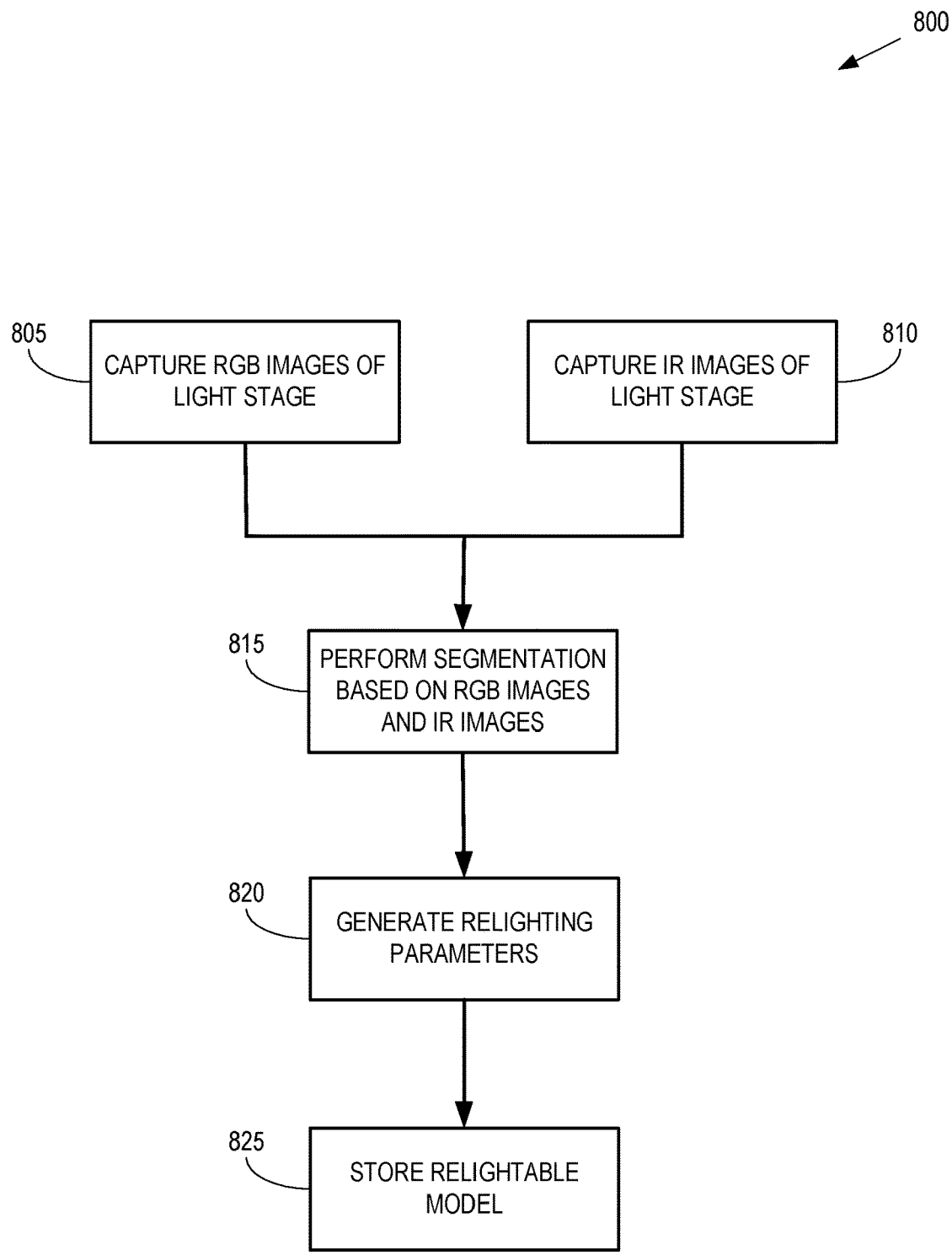
FIG. 8 is a flow diagram of a method of generating a relightable 3D model according to some embodiments.

FIG. 8 is a flow diagram of a method 800 of generating a relightable 3D model according to some embodiments. The method 800 is implemented in some embodiments of the processor 130 shown in FIG. 1, the capture processors 240, 241 shown in FIG. 2, or other processors that have access to the images and depth maps of a human performer captured on a light stage.

At block 805, an array of cameras distributed substantially spherically about the human performer captures color (RGB) images of the human performer on the light stage. At block 810, an array of depth sensors that are substantially spherically distributed about the human performer captures IR images of the human performer on the light stage. As discussed herein, operation of the array of cameras and the array of depth sensors, as well as programmable light units and structured light illuminators, is synchronized using timing signals.

At block 815, a processor performs segmentation of a 3D model of the human performer based on the RGB images and the IR images, e.g., as disclosed herein with regard to FIGS. 5 and 6. At block 820, the processor generates relighting parameters for the 3D model, e.g., as disclosed herein with regard to FIG. 7. At block 825, the processor stores the relightable model including the 3D model in the relighting parameters in a memory such as the memory 245 shown in FIG. 2.

Figure 9:
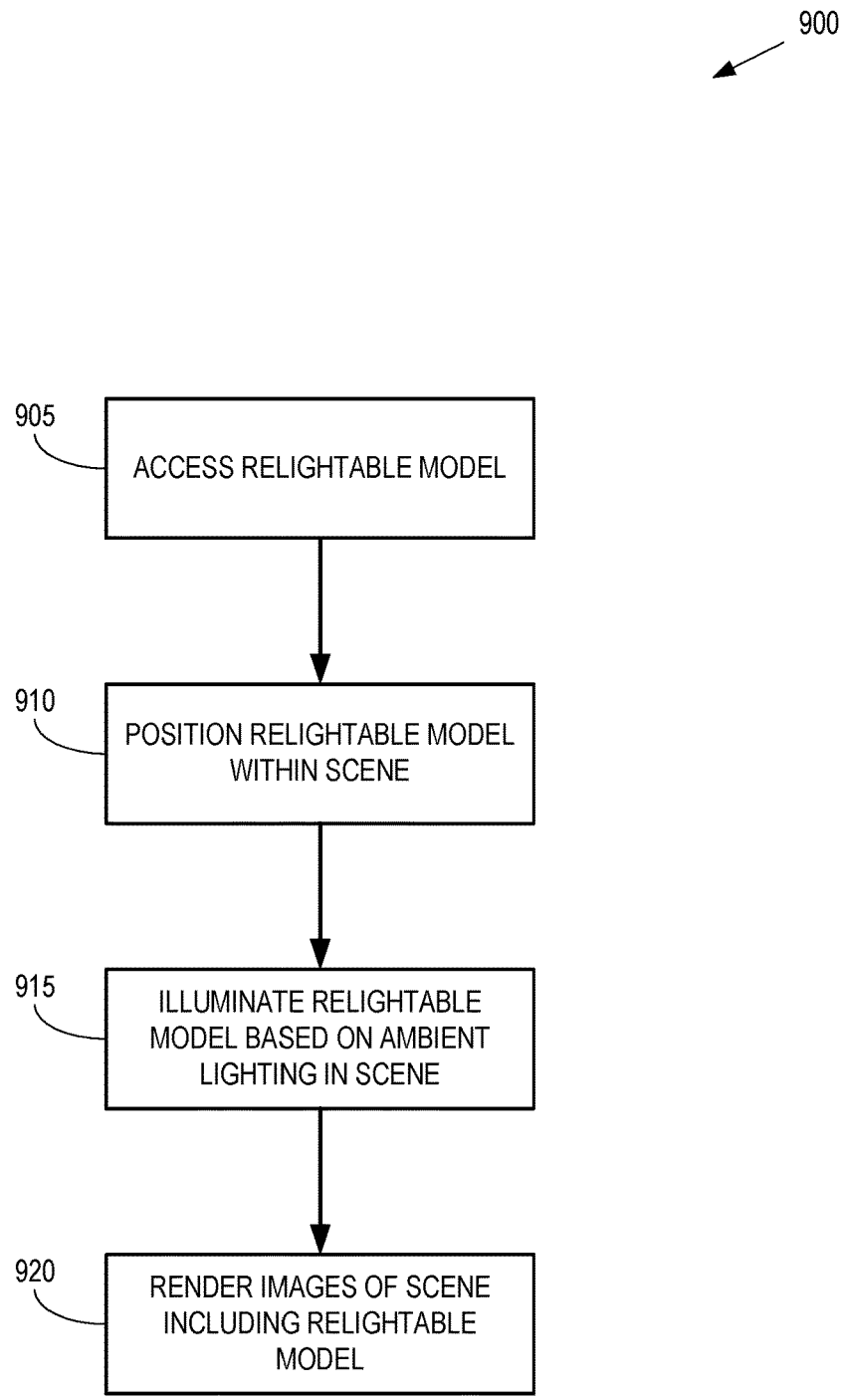
FIG. 9 is a flow diagram of a method of rendering a relightable 3D model under different ambient lighting conditions according to some embodiments.

FIG. 9 is a flow diagram of a method 900 of rendering a relightable 3D model under different ambient lighting conditions according to some embodiments. The method 800 is implemented in some embodiments of the processor 130 shown in FIG. 1, the capture processors 240, 241 shown in FIG. 2, or other processors that have access to 3D model and the corresponding relighting parameters.

At block 905, the processor accesses the relightable model including the 3D model and the relighting parameters. At block 910, the relightable model is positioned within the scene. At block 915, the relightable model is illuminated based on the ambient lighting in the scene. At block 920, the images of the scene including the relightable model are rendered based on the relighting parameters and the ambient lighting that is used to eliminate the 3D model.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a plurality of lights configured to project alternating red-green-blue (RGB) color gradient illumination patterns onto an object or human performer at a predetermined frequency;
a plurality of cameras configured to capture RGB images of an object or human performer corresponding to the alternating RGB color gradient illumination patterns;
a plurality of depth sensors to capture a depth map of the object or human performer at the predetermined frequency; and
at least one processor that implements a machine learning algorithm to produce a three-dimensional (3D) model of the object or human performer based on the captured RGB images and the depth map, the 3D model comprising relighting parameters used to relight the 3D model under different lighting conditions.

2. The apparatus of claim 1, wherein the plurality of lights is configured to project the alternating spherical RGB color gradient illumination patterns as complementary gradients in different color bands that sum to white light.

3. The apparatus of claim 2, wherein the plurality of lights is configured to generate a left-to-right gradient in an intensity of a first color light projected onto the object or human performer in a first time interval and a right-to-left gradient in the intensity of the first color light in a second time interval, a front-to-back gradient in the intensity of a second color light projected onto the object or human performer in the first time interval and a back-to-front intensity of the second color light in the second time interval, and a top-to-bottom gradient in the intensity of a third color light projected onto the object or human performer in the first time interval and a bottom-to-top gradient in the intensity of the third color light in the second time interval.

4. The apparatus of claim 3, wherein a sum of the intensities of the first, second, and third color light over the first time interval and the second time interval produces white light illumination of the object or human performer.

5. The apparatus of claim 1, wherein each depth sensor of the plurality of depth sensors comprises:
a vertical cavity surface emitting laser (VCSEL) that projects a structured pattern of infrared (IR) light onto the object or human performer; and
a stereo pair of IR cameras to capture reflections of the structured IR light.

6. The apparatus of claim 5, wherein the at least one processor is configured to construct the depth map of the object or human performer from images captured by the stereo pair of IR cameras.

7. The apparatus of claim 1, wherein the machine learning algorithm is configured to generate silhouettes of the object or human performer by performing segmentation on the RGB images and the depth map.

8. The apparatus of claim 7, wherein the machine learning algorithm is configured to generate and track a mesh that represents the 3D model of the object or human performer based on the silhouettes and a 3D geometry generated by the plurality of cameras and the plurality of depth sensors.

9. The apparatus of claim 8, wherein the relighting parameters comprise at least one of albedos, surface normals, shininess, and ambient occlusion maps of polygons in the mesh that represents the 3D model of the object or human performer.

10. The apparatus of claim 9, wherein the at least one processor is configured to use the surface normals of polygons in the mesh to increase a resolution of the polygons that represent the mesh.

11. The apparatus of claim 9, wherein the plurality of cameras and the plurality of depth sensors are configured to generate a clean plate sequence of images and depths in the absence of the object or human performer.

12. The apparatus of claim 11, wherein the machine learning algorithm is configured to generate and track the mesh by performing background subtraction of the clean plate sequence from the images and the depth map captured while the object or performer is illuminated by the plurality of lights.

13. The apparatus of claim 12, wherein the at least one processor is configured to perform mesh alignment to align nodes in the meshes that represent the object or human performer in a sequence of keyframes captured by the plurality of cameras and the plurality of depth sensors.

14. The apparatus of claim 1, wherein the at least one processor is configured to identify transitions from a single mesh to multiple meshes representing multiple objects or human performers.

15. A method comprising:
projecting alternating red-green-blue (RGB) color gradient illumination patterns onto an object or human performer at a predetermined frequency;
capturing RGB images of an object or human performer corresponding to the alternating RGB color gradient illumination patterns using a plurality of cameras;
capturing a depth map of the object or human performer at the predetermined frequency using a plurality of depth sensors; and
producing, using a machine learning algorithm, a three-dimensional (3D) model of the object or human performer based on the captured RGB images and the depth map, the 3D model comprising relighting parameters used to relight the 3D model under different lighting conditions.

16. The method of claim 15, wherein projecting the alternating RGB color gradient illumination patterns comprises projecting the alternating RGB color gradient illumination patterns as complementary gradients in different color bands that sum to white light.

17. The method of claim 16, wherein projecting the alternating RGB color gradient illumination patterns comprises generating a left-to-right gradient in an intensity of a first color light projected onto the object or human performer in a first time interval and a right-to-left gradient in the intensity of the first color light in a second time interval, a front-to-back gradient in the intensity of a second color light projected onto the object or human performer in the first time interval and a back-to-front intensity of the second color light in the second time interval, and a top-to-bottom gradient in the intensity of a third color light projected onto the object or human performer in the first time interval and a bottom-to-top gradient in the intensity of the third color light in the second time interval.

18. The method of claim 17, wherein a sum of the intensities of the first, second, and third color light over the first time interval and the second time interval produces white light illumination of the object or human performer.

19. The method of claim 15, wherein capturing the depth map comprises:
projecting, from a plurality of vertical cavity surface emitting lasers (VCSELs), structured patterns of infrared (IR) light onto the object or human performer; and capturing reflections of the structured IR light using a stereo pair of IR cameras.

20. The method of claim 19, further comprising:
constructing the depth map of the object or human performer from images captured by the stereo pair of IR cameras.

21. The method of claim 15, further comprising:
generating, using the machine learning algorithm, silhouettes of the object or human performer by performing segmentation on the RGB images and the depth map.

22. The method of claim 21, further comprising:
generating and tracking, using the machine learning algorithm, a mesh that represents the 3D model of the object or human performer based on the silhouettes and a 3D geometry generated by the plurality of cameras and the plurality of depth sensors.

23. The method of claim 22, wherein the relighting parameters comprise at least one of albedos, surface normals, shininess, and ambient occlusion maps of polygons in the mesh that represents the 3D model of the object or human performer.

24. The method of claim 23, further comprising:
increasing a resolution of the polygons that represent the mesh using the surface normals of polygons in the mesh.

25. The method of claim 23, further comprising:
generating, using the plurality of cameras and the plurality of depth sensors, a clean plate sequence of images and depths in the absence of the object or human performer.

26. The method of claim 25, further comprising:
performing background subtraction of the clean plate sequence from the images and the depth map captured while the object or performer is illuminated by a plurality of lights.

27. The method of claim 26, further comprising:
performing mesh alignment to align nodes in the meshes that represent the object or human performer in a sequence of keyframes captured by the plurality of cameras and the plurality of depth sensors.

28. The method of claim 15, further comprising:
identifying transitions from a single mesh to multiple meshes representing multiple objects or human performers.

29. The method of claim 15, further comprising:
storing the relighting parameters of a first ambient light condition in a memory with the 3D model; and
accessing the relighting parameters from the memory to perform relighting of the 3D model in a second ambient light condition.

* * * * *